May 16, 1950        R. BERTSCHE, JR        2,507,953
GENERATOR CHARGE INDICATOR
Filed July 12, 1946
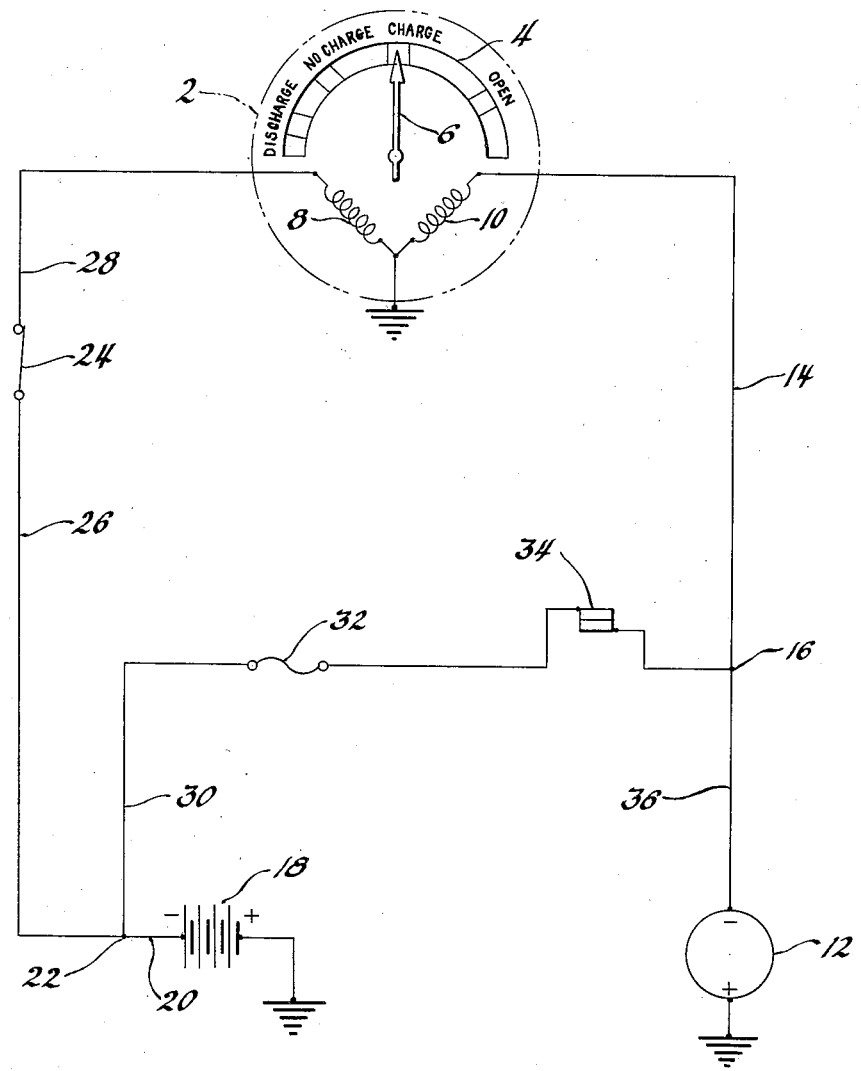
INVENTOR
Ralph Bertsche Jr.
BY
Blackmore, Sources & Flint
ATTORNEYS Patented May 16, 1950

2,507,953

UNITED STATES PATENT OFFICE 2,507,953

GENERATOR CHARGE INDICATOR

Ralph Bertsche, Jr., Detroit, Mich., assignor to General Motors Corporation, Detroit, Mich., a corporation of Delaware Application July 12, 1946, Serial No. 683,000

2 Claims. (Cl. 320—48)

The present invention relates to electrical current indicating devices. More particularly it relates to generator charge indicators including means for indicating circuit failures in the generator-battery circuit.

In automotive vehicles using a generator-battery electrical system, it is quite necessary that the driver of the vehicle have some device available to indicate the condition of operation of this circuit. The conventional means of providing this information is an ammeter connected in series in the generator-battery circuit.

In buses or other vehicles having the generator and battery located in the rear of the vehicle, the conventional means of indicating charge or discharge of the battery is complicated by the requirement of locating the ammeter in the front of the vehicle near the operator. This remote location results in energy losses due to the high amperage of current flowing between the front and the back of the vehicle. It is a well-known fact in the electrical art that such energy losses vary as the square of the current flowing through the conductors. Therefore the energy losses increase rapidly as the current is increased.

The present invention permits the charge indicator to be located remotely from a generator and battery without introducing high electrical losses. This is accomplished by minimizing the flow of current to the indicating device. By this invention the main current flows directly from the generator to the battery and associated engine equipment and only a small indicating current is necessary to operate the meter.

This invention also provides means for indicating discontinuities in the electrical circuit and thereby avoids overloading and consequent damaging of electrical equipment which may be located between the generator and the discontinuity. Devices used previous to this invention show "no charge" on the meter when a break in the circuit occurs and thus obscures the condition of the circuit by indicating that a balanced condition and not a discontinuity exists.

It is an object of the present invention to provide an electrical current meter that is simple in construction and fool-proof in operation.

It is a further object of this invention to provide a generator charge indicator which may be located remotely from the battery and generator without introducing high electrical losses to the system.

It is a still further object of this invention to provide a current meter which gives positive indication of circuit failures within the system.

Other objects will become apparent upon reading this specification and upon inspection of the figures of the drawing and will be specifically pointed out in the claims.

Referring to the drawing, the figure shows a schematic drawing of this invention. 2 is a high resistance galvanometer of the general type shown U. S. patent to Schwarze 2,178,108 having a dial 4 and an indicating vane or armature 6. The armature 6 may be of magnetic material if it is desired to have this vane sensitive to polarity or it may be made from soft iron if no sensitivity to polarity is desired. In the preferred form of this invention, this vane is made from soft iron. Incorporated in this meter in operative relationship to the armature 6 are the high resistance differentially wound field coils 8 and 10. These coils are so wound and connected in the rest of the circuit that they produce a differential field affecting the vane 6. 12 is a generator having its negative terminal connected to the conductor 36 and its positive terminal connected to ground. Conductor 14 is connected to one terminal of the meter field coil 10, the other terminal of which is connected to ground. The current through this field coil and consequently the density of magnetic flux set up by this coil is proportional to the potential present at the terminal 16. 18 is a battery having its negative terminal connected to a conductor 20 and its positive terminal connected to ground. 24 is the ignition switch of the motor vehicle and is closed at all times when the circuit is operative. The circuit between the negative terminal of battery 18 and the field coil 8 of the meter is completed through conductors 20, 26 and 28 and the ignition switch 24. The current through the field coil 8 and therefore the density of the magnetic flux set up by this coil is proportional to the potential at the terminal 22. The conductor 30 transmits current between the battery and the generator. 32 is a fuse to protect the electrical system in event of short-circuiting of the electrical system. 34 is a relay type circuit breaker which permits only unidirectional flow of current from the generator the resistance of the circuit from 16 through 34, 32, and 30 to 22 is usually less than one ohm. In one particular 12 volt installation with 120 ampere charging current this resistance is in the order of .0025 ohm.

The operation of the device is as follows:

Initial adjustment of indicator is made so that with maximum charging current flowing through circuit 36, 34, 32, 30, 20, vane 6 will assume the position marked "Charge" on dial 4. However, adjustment is made so that irrespective of actual value of resistance of the circuit 16 through 34, 32, 30 to 22, the potential difference existing between points 16 and 22 resulting from resistance of said circuit under condition of charge is sufficiently less than potential difference encountered in discontinuity of said circuit so that positive indication of such discontinuity is obtained.

The field coils 8 and 10 set up a combined electromagnetic field affecting the armature 6. The polarization and intensity of this field is determined by the combined currents flowing in conductors 14 and 28. For example, if the voltage at the terminal 16 is in excess of the potential at the terminal 22 and no discontinuity exists, current will flow from the generator to the battery and therefore charge the battery. The field coil 10 will produce greater magnetic flux than that set up by field coil 8 and the combined effects of these fields will cause the vane 6 to assume the position shown in the figure. If the potential at the terminals 22 and 16 are equal, the flux set up by the field coils 10 and 8 will be equal and the vane or armature 6 will assume the position marked "No charge" on the dial 4. If the potential at the terminal 22 exceeds that of the terminal 16, the magnetic flux produced by the coil 8 will exceed that produced by the coil 10 and the vane will asume the position indicating "Discharge" on the dial 4. In event of circuit failure between the generator and the battery, for example the fuse 32 failing, the battery load will be removed from the generator and the potential at 16 will be increased a very large amount due to the removal of this load. The potential at the terminal 22 will be the same as it is in the "No charge" condition and therefore the electromagnetic field set up by the coil 10 will greatly exceed that produced by the coil 8. This will cause the vane 6 to assume the position shown as "Open" on the dial 4.

It is to be understood that although the invention has been described with specific reference to a particular embodiment thereof, it is not to be so limited, since changes and alterations therein may be made which are within the full intended scope of this invention as defined by the appended claims.

I claim:

1. A generator charge indicating system including a voltage differential indicating means connected to like polarity terminals of a generator and a battery, a second circuit between said generator and battery terminals, said second circuit having inherent electrical resistance, said voltage differential indicating means so graduated as to indicate charge or discharge of said battery and whether circuit discontinuities exist between said generator and said battery.

2. A voltage differential indicating means having two differentially wound field coils, one terminal of one coil connected to one terminal of a generator and one terminal of the other coil connected to a like polarity terminal of a battery and the second terminal of each coil connected to ground, a second circuit between said generator and battery terminals, said second circuit having inherent electrical resistance, the said voltage differential indicating means capable of indicating the voltage differential between said generator and said battery and also any discontinuity in said second circuit.

RALPH BERTSCHE, Jr.

REFERENCES CITED

The following references are of record in the file of this patent:

UNITED STATES PATENTS

| Number | Name | Date |
| --- | --- | --- |
| 691,144 | Hutchison | Jan. 14, 1902 |
| 835,461 | Northrup | Nov. 6, 1906 |
| 892,500 | Chamberlain | July 7, 1908 |
| 972,210 | Motsinger | Oct. 11, 1910 |
| 967,597 | Zander | Aug. 16, 1910 |
| 1,841,341 | Tanner | Jan. 12, 1932 |
| 2,178,108 | Schwarze | Oct. 31, 1939 |
| 2,248,504 | Kenny | July 8, 1941 |